US010136404B2

United States Patent
Tujkovic

(10) Patent No.: US 10,136,404 B2
(45) Date of Patent: *Nov. 20, 2018

(54) RECIPROCITY CALIBRATION FOR MULTIPLE-INPUT MULTIPLE-OUTPUT SYSTEMS

(71) Applicant: Facebook, Inc., Menlo Park, CA (US)

(72) Inventor: Djordje Tujkovic, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,339

(22) Filed: Sep. 6, 2017

(65) Prior Publication Data

US 2018/0014267 A1    Jan. 11, 2018

Related U.S. Application Data

(63) Continuation of application No. 15/406,675, filed on Jan. 14, 2017, now Pat. No. 9,788,292, which is a (Continued)

(51) Int. Cl.
*H04B 7/06* (2006.01)
*H04W 56/00* (2009.01)
(Continued)

(52) U.S. Cl.
CPC ........ *H04W 56/003* (2013.01); *H04B 7/0413* (2013.01); *H04B 7/0617* (2013.01);
(Continued)

(58) Field of Classification Search
CPC .......... H04B 7/02; H04B 7/04; H04B 7/0404; H04B 7/0408; H04B 7/0413; H04B 7/0417; H04B 7/0421
(Continued)

(56) References Cited

U.S. PATENT DOCUMENTS

| 7,366,245 | B2 | 4/2008 | Li et al. |
| 8,644,265 | B2 * | 2/2014 | Wang .................... H04L 1/0026 370/335 |

(Continued)

*Primary Examiner* — Siu Lee
(74) *Attorney, Agent, or Firm* — Brian R. Short

(57) ABSTRACT

Systems and associated methods for reciprocity calibration of multiple-input multiple-output (MIMO) wireless communication are disclosed herein. In one embodiment, a method for reciprocity calibration of the MIMO system includes transmitting a pilot symbol by a transmitter (TX) of the reference antenna and receiving the pilot symbol by receivers (RXes) of antennas of a base station as $r_{i,0}$ pilot symbols. (Index "i" denotes individual antenna "i" of the base station, and "0" denotes the reference antenna.) The method further includes transmitting the received pilot symbols by TXes of the antennas of the base station, receiving the pilot symbols transmitted by the antennas of the base station by the reference antenna as $r_{0,i}$ pilot symbols, and calculating non-reciprocity compensation factors as $$\frac{r_{i,0}}{r_{0,i}}.$$

18 Claims, 2 Drawing Sheets

Related U.S. Application Data continuation of application No. 14/982,589, filed on Dec. 29, 2015, now Pat. No. 9,584,198.

(51) Int. Cl.

| | |
|---|---|
| *H04B 7/0413* | (2017.01) |
| *H04L 5/00* | (2006.01) |
| *H04B 17/30* | (2015.01) |
| *H04B 17/11* | (2015.01) |
| *H04B 17/14* | (2015.01) |
| *H04B 17/391* | (2015.01) |
| *H04W 4/20* | (2018.01) |

(52) U.S. Cl.
CPC ............ *H04B 17/11* (2015.01); *H04B 17/14* (2015.01); *H04B 17/30* (2015.01); *H04B 17/3911* (2015.01); *H04L 5/005* (2013.01); *H04L 5/0048* (2013.01); *H04W 4/20* (2013.01); *H04L 5/0023* (2013.01)

(58) Field of Classification Search
USPC ....... 375/259, 260, 267, 285, 295, 296, 299, 375/316, 346, 347
See application file for complete search history.

(56) References Cited

U.S. PATENT DOCUMENTS

| | | | |
|---|---|---|---|
| 9,014,066 | B1 | 4/2015 | Wang et al. |
| 9,584,198 | B1* | 2/2017 | Tujkovic ............... H04B 7/0413 |
| 9,788,292 | B2* | 10/2017 | Tujkovic ............... H04B 7/0413 |
| 9,800,284 | B2* | 10/2017 | Papadopoulos .......... H04B 1/40 |
| 2004/0157567 | A1 | 8/2004 | Jootar et al. |
| 2006/0146725 | A1 | 7/2006 | Li et al. |
| 2008/0141540 | A1 | 6/2008 | Chen |
| 2009/0186590 | A1* | 7/2009 | Gale ....................... H04B 17/21 |
| | | | 455/272 |
| 2010/0303015 | A1* | 12/2010 | Ko ........................ H04B 7/024 |
| | | | 370/328 |
| 2015/0222336 | A1* | 8/2015 | Yilmaz .................. H04B 7/024 |
| | | | 370/252 |

* cited by examiner

RECIPROCITY CALIBRATION FOR MULTIPLE-INPUT MULTIPLE-OUTPUT SYSTEMS

RELATED APPLICATIONS

This patent application is a continuation of U.S. patent application Ser. No. 15/406,675 filed Jan. 14, 2017, which is a continuation of U.S. patent application Ser. No. 14/982,589 filed Jan. 14, 2017, and granted as U.S. Pat. No. 9,584,198 on Feb. 28, 2017, which are all herein incorporated by reference.

TECHNICAL FIELD

The disclosed embodiments are generally related to the field of multiple-input multiple-output (MIMO) wireless communication between base stations and mobile device users. More specifically, the disclosed embodiments are related to calibration of the MIMO systems.

BACKGROUND

As spectral bandwidth becomes an ever more valuable commodity for radio communication systems, techniques are needed to effectively use the available bandwidth. MIMO wireless technology is one such technique. MIMO uses multiple transmitters and multiple receivers to increase data throughput, e.g., to increase data transfer bandwidth, and/or to improve the signal-to-noise (SNR) ratio, e.g., to reduce the signal fading. With respect to increased data transfer bandwidth, the MIMO increases the capacity of a data channel by increasing the number of receive (RX) and transmit (TX) antennas to take advantage of signal multipathing. For example, multiple pairs of transmit/receive antennas can be deployed in the communication system to transmit multiple spatial streams (e.g., wireless signals or symbols). These data streams can be transmitted simultaneously and on a single frequency by using proper multiplexing (MUX) at the TX side of the communication system. The combination of multiple, independent data paths increases the throughput of a MIMO system. At the RX side of the MIMO system, the transferred data are recombined into the original data stream using suitable demultiplexing (de-MUX). Typically, an increase of the number of RX and TX antenna pairs linearly increases the throughput of the MIMO system.

Furthermore, the MIMO systems can improve SNR ratio of the wireless data. For example, the same wireless signals can take multiple paths from the TX to the RX as the wireless signals reflect from objects that are in the path of, or adjacent to, the TX and RX. In absence of MIMO, these multiple paths would generally increase signal interference at the RX. However, with MIMO systems these additional paths can be utilized to improve the SNR of the wireless signals. For example, in a relatively simple implementation, a MIMO system may identify and select the strongest signal among the multiple available signals, while discarding other signals. In more advanced implementations, a MIMO system may accept multiple wireless signals as representing different versions of the same wireless signal having slight delays because of the reflection of the signal or because of differing distances traveled by the various paths from the TX antenna to the RX antenna. Generally, multiple versions of the same signal undergo statistically independent fading because the signals travel along different physical paths. When these different versions of the signal are summed up (or otherwise combined using proper adjustments for differing time delays or phase changes) into a resulting signal, the SNR improves due to statistical independence of the signal fading.

However, for practical MIMO systems, it is difficult to properly characterize different data channels (e.g., to calibrate gains and delays from one antenna to another). Furthermore, data channels may behave differently based on the direction of data transfer (e.g., whether the antenna sends the signal or receives it, or whether the wireless signal is transferred from antenna 1 to antenna 2 or from antenna 2 to antenna 1). Accordingly, a need remains for improved characterization of data channels in MIMO systems.

DETAILED DESCRIPTION

The following disclosure describes various embodiments of systems and associated methods for calibrating data channels in multiple-input multiple-output (MIMO) communication systems. In some embodiments, MIMO communication systems can be used for both upload (UL) and download (DL) of the wireless data (also referred to as symbols). With these systems, an individual antenna of a MIMO transceiver (TRX) at a base station can be connected to a receiver (RX) when the antenna receives data from user equipment (UE), e.g., a mobile phone, or to a transmitter (TX) when the antenna sends data to the UE. However, the RX and TX channels of the same TRX are not necessarily reciprocal, e.g., the channels may have different delays, phase distortions, amplitude amplification, etc. Therefore, in at least some embodiments, dedicated calibration symbols (also referred to as pilot symbols or calibration tones) can be transmitted from one of the antennas of the base station to other antennas to calibrate the MIMO communication system by estimating the behavior of the RX/TX propagation channels. In some embodiments, a reciprocity compensation matrix ($C_T$) can be calculated by transmitting and receiving pilot symbols and estimating their amplitude and phase. The application of a reciprocity compensation matrix can improve reciprocity of the data channels, thereby, e.g., improving system throughput or signal to noise ratio (SNR).

In some embodiments, the pilot symbols can be transmitted by an auxiliary (AUX) antenna that is specifically dedicated to the calibration of the MIMO system. In some embodiments, the pilot symbols can be transmitted outside of the frequency bandwidth that is dedicated to normal data payload. With these embodiments, the pilot symbols may be transmitted either continuously or intermittently. In some other embodiments, the pilot symbols may be transmitted within the frequency bandwidth that is reserved for the data payload by, for example, intermittently pausing the transmission of the payload data and transmitting the pilot symbols. In at least some embodiments, the power (e.g., the power spectral density) of the pilot symbols may be comparable to the power of the symbols of the payload data to minimize phase noise and compression at the RXes.

Figure 1:
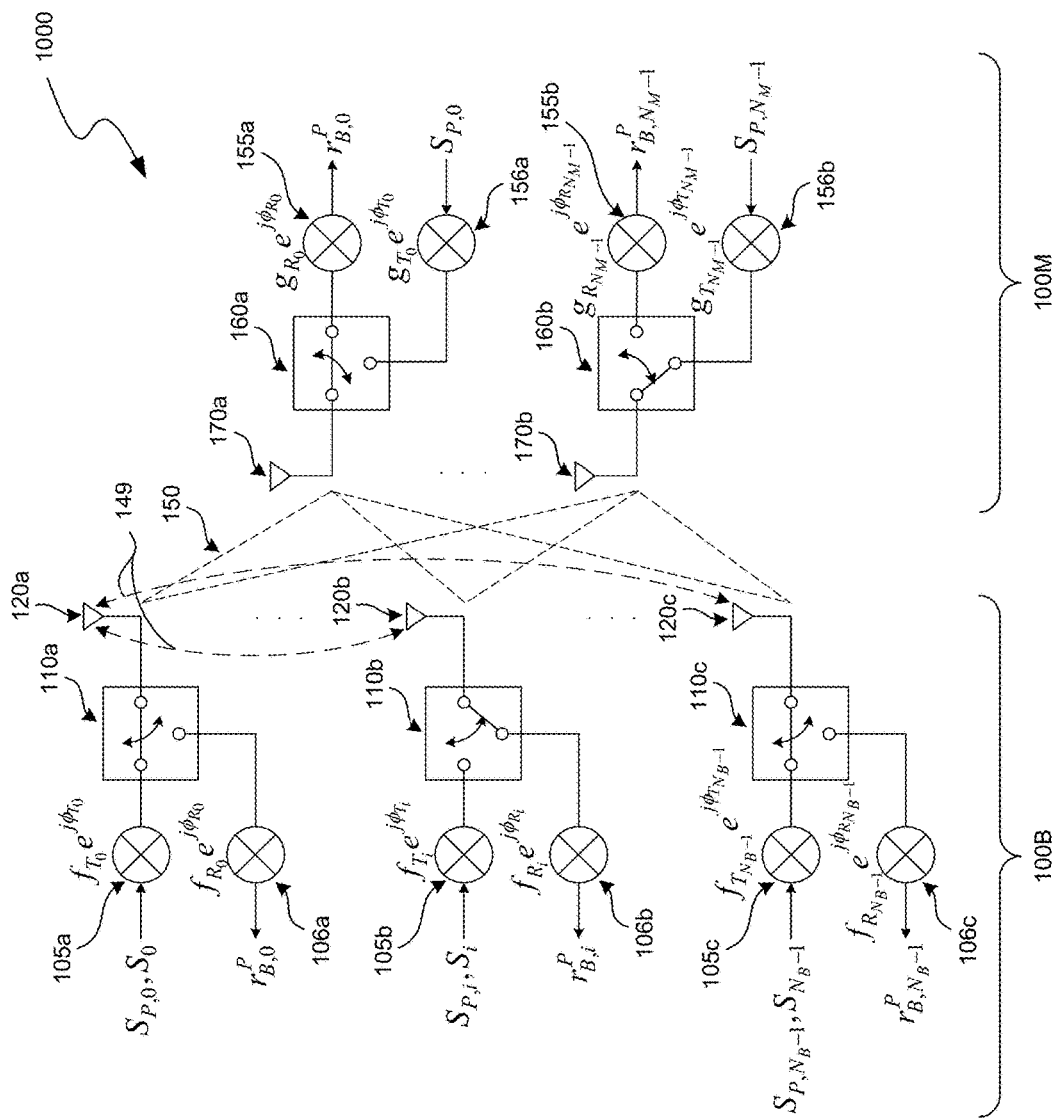
FIG. 1 is a schematic view of a MIMO system in accordance with an embodiment of the present technology.

FIG. 1 is a schematic view of a MIMO system 1000 in accordance with a disclosed embodiment. The illustrated MIMO system includes up to $N_B$ TRXes 105/106 at a base station 100B, and up to $N_M$ TRXes 155/156 at a user equipment (UE) side 100M. At the base station 100B, multiple TXes 105b-105c may transmit signals from their respective antennas 120a-120c to one or more antennas 170a-170b connected to RXes 155a-155b of the UE side 100M. In some embodiments, beamforming may be used to direct signals from the antennas 120a-120c over multiple paths 150 toward the UE side 100M. The signals received by the RXes 155a-155b of the UE side can be further processed and sent to user equipment as, e.g., audio signal in phone conversation. Conversely, TXes 156a-156b can send signals from the antennas 170a-170b at the UE side 100M to the antennas 120a-120c and their corresponding RXes 106a-106c of the base station 100B. The received signals at the base station may be audio signals, digital images, text signals, etc., that are retransmitted to, e.g., a different antenna (e.g., a different user) at the UE side 100M. In some embodiments, the antennas 170a-170b at the UE side 100M can be used for beamforming to, for example, improve signal transmission toward a selected antenna of the base station 100B. As an example, the TRX 105a/106a includes a TX 105a and an RX 106a that can be individually connected to an antenna 120a through a switch 110a. The illustrated TX 105a may send symbol $S_0$ having amplitude $f_{T_0}$ and phase $e^{j\phi T_0}$ to one or more antennas 170 at the UE side 100M of the MIMO system 1000. The symbol $S_0$ may be received as, for example, symbol $r_{B,N_M-1}^P$ at an RX 155b at the UE side 100M. In another example, a TX 156a may send a pilot symbol $S_{P,0}$ having amplitude $g_{T_0}$ and phase $e^{j\phi R_0}$ (or other, non-pilot symbol $S_0$) to, for example, RX 106c that receives the sent symbol as a symbol $r_{B,N_B-1}^P$ having amplitude $f_{R_{N_B-1}}$ and phase $e^{j\phi R_{NB-1}}$. Many other combinations of transmitted and received symbols are possible with the MIMO system 1000. Two TRXes 160a, 160b are illustrated at the UE 100M, but the UE may include a larger number of the TRXes. In the illustrated embodiment, the TXes 105a and 105c of the base station 100B and the TX 156b of the UE 100M send symbols to their respective antennas, while the RX 106b of the base station 100B and the RX 155a of the UE 100M receive symbols, but other combinations of TX/RX are also possible, depending on particular data transfer or calibration needs. In at least some embodiments, the multiple antennas of the MIMO system 100 may increase data throughput (e.g., data bandwidth) and/or improve the SNR of the transmitted symbols. For example, the symbols $S_0$ transmitted by an antenna 120a at the base station 100B can be received by antennas 170a-170b at the UE side, and may be recombined to improve either data throughput of the system or the SNR or both. In at least some embodiments, the antennas of the base station side 100B may be used for beamforming, i.e., for directing the transmit/receive symbols in a preferred direction.

For a MIMO system that operates in a time domain division (TDD) multiplexing mode, a combined radio propagation channel H (e.g., a transfer function of the channel) that operates between $N_B$ antennas at the base station 100B and $N_M$ antennas at the UE 100M can be assumed as reciprocal, i.e., it can be assumed that:

$$H_{UL} = H_{DL}^T \quad (1)$$

where UL stands for data upload from the base station 100B to the UE 100M, and DL stands for data download from the UE 100M to the base station 100B. Therefore, the MIMO systems described by equation (1) rely on channel reciprocity by, for example, assuming that the TX 105b and RX 106b (or other TX/RX pairs of a transceiver) are reciprocal. However, in some practical applications, the reciprocity between the TX and RX that use the same antenna pair (e.g., are connected to a same antenna) is not present, therefore requiring calibration for improved performance of the overall MIMO system 1000. A non-reciprocal combined radio propagation channel H can be characterized as:

$$\tilde{H}_{UL} \neq \tilde{H}_{DL}^T \quad (2)$$

where $\tilde{H}_{UL}$ and $\tilde{H}_{DL}$ stand for observed (e.g., measured) values of data upload and download, respectively.

In some embodiments, the improved reciprocity may be more important for the base station 100B of the MIMO system 1000 than for the UE side 100M. Therefore, in at least some embodiments, the base station 100B may be calibrated as follows. The received signal at the base station 100B (e.g., the signal received at the RXes 106a-106c) can be represented in a matrix form as:

$$r_B^P = \tilde{H}_{UL} S_P \quad (3.1)$$

or, when $\tilde{H}_{UL}$ is expressed as a function of $H_{UL}$, equation (3.1) can be rewritten as:

$$r_B^P = B_R H_{UL} M_T S_P \quad (3.2)$$

where $$B_R = \text{diag}\left\{ f_{R_0} e^{j\phi R_0}, \ldots, f_{R_{N_B-1}} e^{j\phi R_{N_B-1}} \right\}$$

(a diagonal matrix of amplitude/phase for the RXes of the base station 100B), $$M_T = \text{diag}\left\{ g_{T_0} e^{j\varphi T_0}, \ldots, g_{T_{N_M-1}} e^{j\varphi T_{N_M-1}} \right\}$$

(a diagonal matrix of amplitude/phase for the TXes of the UE 100M), and $S_P$ is a $N_M \times 1$ vector of transmitted symbols (e.g., pilots) during the upload from the base station to the UE.

Analogously to equations (3.1) and (3.2) above, the received signals at the UE 100M can be represented as:

$$r_M^P = \tilde{H}_{DL} S_P \quad (4.1)$$

or as:

$$r_M^P = M_R H_{UL}^T B_T S_P \quad (4.2)$$

where $$M_R = \text{diag}\left\{ g_{R_0} e^{j\varphi R_0}, \ldots, g_{R_{N_M-1}} e^{j\varphi R_{N_M-1}} \right\}$$

(a diagonal matrix of amplitude/phase for the RXes of the UE 100M), and $$B_T = \text{diag}\left\{ f_{T_0} e^{j\phi T_0}, \ldots, f_{T_{N_B-1}} e^{j\phi T_{N_B-1}} \right\}$$

(a diagonal matrix of amplitude/phase for the TXes of the base station 100B), and $S_P$ is a $N_B \times 1$ vector of transmitted symbols (e.g., pilots) during the upload from the base station to the UE.

As discussed with respect to equation (2), the estimated (e.g., measured) values of $\tilde{H}_{UL}$ and $\tilde{H}_{DL}{}^T$ are not necessarily the same. However, since we know from equation (1) that the propagation channel can be modeled as $H_{UL} = H_{DL}{}^T$, the equations (3.2) and (4.2) can be recombined as:

$$B_R^{-1} \tilde{H}_{UL} M_T^{-1} = B_T^{-T} \tilde{H}_{DL}{}^T M_R^{-T} \tag{5}$$

and can be further reduced to:

$$\tilde{H}_{DL} = M_R M_T^{-T} \tilde{H}_{UL}{}^T B^{-T} B_T \tag{6}$$

Since by definition $M = M_R M_T^{-T}$ and $B = B_R^{-T} B_T$, equation (6) can be further simplified to:

$$\tilde{H}_{DL} = M \tilde{H}_{UL}{}^T B \tag{7}$$

The diagonal matrices M (for the UEs) and B (for the base station) can be further rewritten as:

$$M = \text{diag}\left\{ \frac{g_{R_0}}{g_{T_0}} e^{j(\varphi_{R_0} - \varphi_{T_0})}, \ldots, \frac{g_{R_{N_M-1}}}{g_{T_{R_{N_M-1}}}} e^{j(\varphi_{R_{N_M-1}} - \varphi_{T_{N_M-1}})} \right\}, \tag{8.1}$$

which can be simplified to:

$$M = \text{diag}\{G_0 e^{j\Delta\varphi_0}, \ldots, G_{N_M-1} e^{j\Delta\varphi_{N_M-1}}\} \tag{8.2}$$

Similarly, the matrix B can be rewritten and simplified as:

$$B = \text{diag}\{F_0 e^{j\Delta\varphi_0}, \ldots, F_{N_B-1} e^{j\Delta\varphi_{N_B-1}}\}, \tag{9}$$

where $$F_i = \frac{f_{T_i}}{f_{R_i}}, e^{j\Delta\phi_i} = e^{j(\phi_{T_i} - \phi_{R_i})}, i = 0, \ldots, N_B - 1.$$

Equation (7) provides a relationship between the measured upload (UL) and download (DL) propagation channels.

In at least some embodiments, the orthogonality among the antennas at the UE side 100M is preserved despite lack of reciprocity of a set of single antennas (SSs). For example, differences in phase and gain between TX and RX paths can still exist without causing a loss in orthogonality provided that these differences in phase/gain are uniform across the antennas of the base station 100B. In at least some embodiments, these uniform differences across the antennas of the base station as well as the lack of reciprocity within an individual TRX can be accounted for by the channel calibration at the UE side 100M. Such a channel calibration is generally known as a relative channel calibration. Some embodiments of the relative channel calibration are described below with reference to FIGS. 2 and 3.

Figure 2:
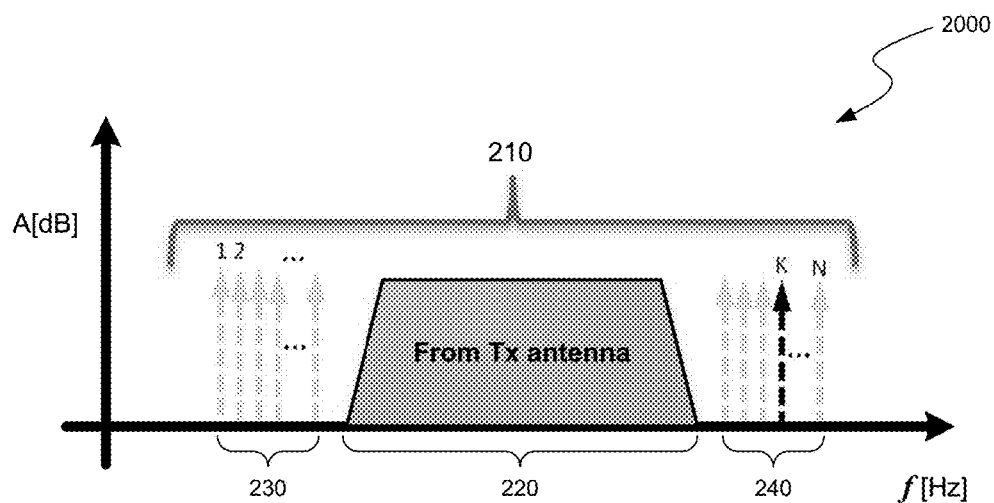
FIG. 2 is a graph diagram of upload (DL) antenna calibration in accordance with an embodiment of the present technology.

FIG. 2 is a graph diagram 2000 of antenna calibration in accordance with some embodiments. In the illustrated embodiment, the horizontal axis represents frequency and the vertical axis represents amplitude of data symbols. A total bandwidth of the illustrated DL data transmission is denoted as 210. Within the total bandwidth 210, a range of frequencies 220 is a frequency bandwidth of the data payload (e.g., the symbols of the DL data frame) for a sample antenna K of the base station (e.g., corresponding to antenna 120b in FIG. 1). Frequency bandwidths 230 and 240 may correspond to frequency guard bands for the antenna K. In some embodiments, in addition to transmitting the symbols within the frequency bandwidth 220, the antenna K may also transmit one or more calibration symbols (also called pilot symbols or calibration tones). An example of a pilot symbol is shown as a narrow band tone K inside frequency bandwidth 240. Other pilot symbols may be transmitted by other antennas, for example pilot symbols 1, 2 or N may be transmitted by their corresponding antennas 1, 2 or N. In some embodiments, a dedicated auxiliary (AUX) antenna can be used for the pilot symbols thereby preserving the bandwidth of the antennas of the base station for the data payload. In some embodiments, other antennas on the base station side may have comparable bandwidths. The pilot symbols (e.g., the pilot symbol K) can be received by other antennas of the base station (e.g., antennas 120a, 120c). In some embodiments, the power of the pilot symbol(s) may be comparable to the power of the symbols within the DL data frame to reduce phase noise and compression/desense of the RXes. The pilot symbols can be used to estimate the non-reciprocity compensation $C_T$, as explained in more detail below.

Figure 3:
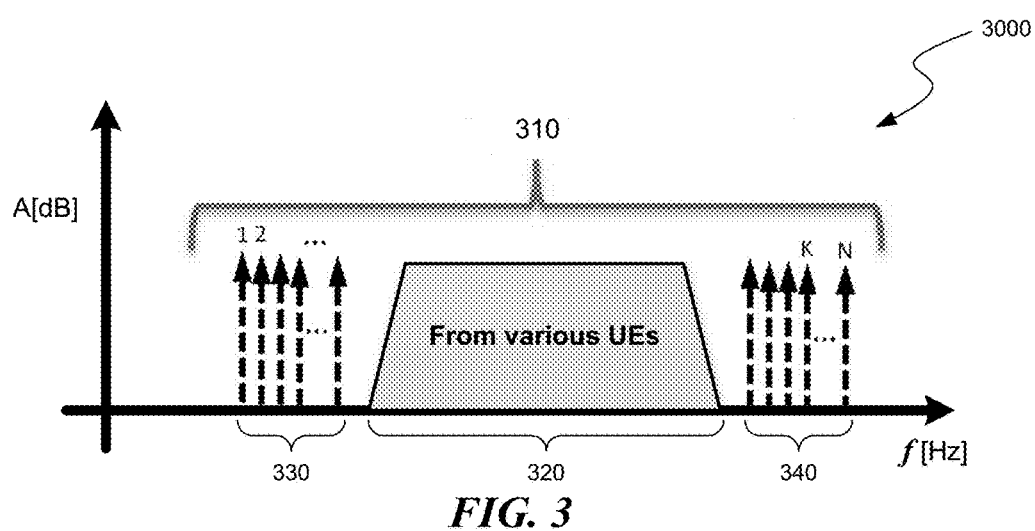
FIG. 3 is a graph diagram of upload (UL) antenna calibration in accordance with an embodiment of the present technology.

FIG. 3 is a graph diagram 3000 of upload (UL) antenna calibration in accordance with an embodiment of the present technology. In the illustrated embodiment, the symbols of the UL data frame are transmitted by UE antennas (e.g., antennas 170 or 170b) within a frequency bandwidth 310. A frequency bandwidth 320 corresponds to the data frame (e.g., symbols in the data payload). In some embodiments, an auxiliary (AUX) antenna (e.g., an antenna dedicated to calibration) may generate symbols illustrated in the graph 3000. Frequency bandwidths 330 and 340 may be reserved for the pilot symbols. For example, the AUX antenna may transmit dedicated pilot symbols 1, 2, ..., K, ... N to the corresponding antennas 1-N at the base station. In other embodiments, the AUX antenna may transmit only one or several pilot symbols for one or several antennas of the base station. In some embodiments, an antenna of the UE side may play a role of the AUX antenna for calibration purposes. In some embodiments, the power of the pilot symbol(s) may be comparable to the power of the symbols within the DL data frame to keep different antennas of the base station balanced and/or to minimize the phase noise and compression at the RXes of the base station. In some embodiments, the symbols within the data frame frequency bandwidth (e.g., frequency bandwidths 220 in FIG. 2 and/or 320 in FIG. 3) may be used as the pilot symbols (in every data frame or intermittently in some data frames).

In at least some embodiments, a compensation can be employed to minimize or eliminate the non-reciprocity between the RX and TX path of the TRXes of, for example, base station 100B. For, example a beamforming W in the matrix form $N_B \times N_M$ can be applied to a set of single antennas (SSs). When the non-reciprocity compensation $C_T$ (having the matrix form $N_B \times N_B$) is introduced, the received signal at the UE side 100M can be represented as:

$$r_M = \tilde{H}_{DL} C_T W S \tag{10}$$

The non-reciprocity compensation $C_T$ can be subjected to a constraint:

$$BC_T = \alpha e^{j\delta} I \tag{11}$$

where I is an identity matrix, a is an amplitude, and $e^{j\delta}$ is a phase of the wireless signal. In at least some embodiments, the effective channel observed on pilot symbols on the UE side 100M can be treated as being indeed reciprocal, allowing the received signal $r_M$ from equation (10) to be expressed as:

$$r_M = M \tilde{H}_{UL}^T B C_T W S \quad (12.1)$$

When equation (11) is combined with equation (12.1), the following expression for $r_M$ is obtained:

$$r_M = \alpha e^{j\delta} M \tilde{H}_{UL}^T W S \quad (12.2)$$

At this point, it becomes possible to compensate for lack of reciprocity of the single antennas (SSs) based on auxiliary frequency non-selective complex gain, which can be based by channel estimation performed on DL symbol transfer. In some embodiments, the signal can be sent from the base station 100B to the UE side 100M using maximal ratio transmission (MRT) beamforming or zero-force (ZF) beamforming. For example, for the UE side impairment matrix $W_{MRT}$ using MRT beamforming, we can write:

$$W_{MRT} = \tilde{H}_{UL}^* \quad (13.1)$$

or $$W_{MRT} = (\tilde{H}_{UL}^T)^H \quad (13.2)$$

and $$r_M = \alpha e^{j\delta} M \tilde{H}_{UL}^T W S \quad (13.3)$$

Similarly, for ZF beamforming, the following estimates are valid for the impairment matrix $W_{ZF}$ and the received signal $r_M$ at the UE side:

$$W_{ZF} = (\tilde{H}_{UL}^T)^T ((\tilde{H}_{UL}^T)(\tilde{H}_{UL}^T)^T)^{-1} \quad (14.1)$$

or $$W_{ZF} = \tilde{H}_{UL}^* (\tilde{H}_{UL}^T \tilde{H}_{UL}^*)^{-1} \quad (14.2)$$

or $$r_M = e^{j\Delta} M \tilde{H}_{UL}^T \tilde{H}_{UL}^* (\tilde{H}_{UL}^T \tilde{H}_{UL}^*)^{-1} S \quad (14.3)$$

Equation (14.3) can be reduced to:

$$r_M = \alpha e^{j\delta} M S \quad (14.4)$$

As shown in equations (13.3) and (14.3), in either the MRT or ZF beamforming (or other modes of wireless data transfer), the beamforming antennas may remain orthogonal even in absence of reciprocity within the TRXes of the individual antennas.

Without a loss of generality, a calibration procedure can be developed as follows. We can assume:

$$\delta = \Delta \phi_0, \quad \alpha = F_0 = \frac{f_{T_0}}{f_{R_0}} \quad (15)$$

Therefore, the $N_B \times N_B$ non-reciprocity compensation matrix $C_T$ (for the base station 100B) can be written as:

$$C_T = \alpha e^{j\phi_0} B^{-1} \quad (16.1)$$

or $$C_T = \text{diag}\{1, C_T^1, \ldots, C_T^{N_B-1}\} \quad (16.2)$$

The individual components of the $C_T$ can be written as:

$$C_T^i = \frac{f_{T_0}}{f_{R_0}} \frac{f_{R_i}}{f_{T_i}} e^{j(\phi_{T_0} - \phi_{R_0})} e^{-j(\phi_{T_i} - \phi_{R_i})} \quad (17)$$

Therefore, the individual component $C_T^i$ represents a ratio with a numerator being a signal sent from an antenna "0" of the base station (e.g., the antenna 105a) and received by antenna "i" of the base station (e.g., the antenna 120b) and a denominator being a signal sent from the antenna "i" and received by the antenna "0." Some possible paths for the signals sent from the TXes to the RXes of the base station are shown as paths 14b in FIG. 1.

In at least some embodiments, the components $C_T^i$ of the non-reciprocity compensation matrix $C_T$ can be used for the calibration procedure that uses pilot symbols. As explained with reference to FIGS. 2 and 3, in some embodiments the calibration procedure may involve transmitting pilot symbols from one of the $N_B$ antennas (e.g., antenna 0) of the base station 100B and receiving the signal $r_{i,0}$ on the remaining antennas (e.g., antennas 1 to $N_B-1$) of the base station. Therefore, in this scenario, the antenna 0 may at least temporarily be the reference antenna that transmits signal:

$$r_{0,i} = f_{R_0} e^{j\phi_{R_0}} H_{0,i} f_{T_i} e^{j\phi_{T_i}} S^C \quad (18)$$

Furthermore, the same set of pilot symbols that was received by the receiving antennas 1 to $N_B-1$ may be transmitted the receiving antennas and received by the reference antenna 0 as:

$$r_{0,i} = f_{R_0} e^{j\phi_{R_0}} H_{0,i} f_{T_i} e^{j\phi_{T_i}} S^C \quad (19)$$

In at least some embodiments, the transmission from different antennas can be orthogonalized, either in time domain or in frequency domain. Because of the reciprocity of the radio propagation channel (e.g., as in equation (1) above), the followings is true for the antenna 0:

$$H_{0,i} = H_{i,0} \quad (20)$$

Therefore, for an individual TRX "i," the non-reciprocity compensation can be expressed as:

$$\frac{r_{i,0}}{r_{0,i}} = \frac{f_{R_i} e^{j\phi_{R_i}} H_{i,0} f_{T_0} e^{j\phi_{T_0}} S^C}{f_{R_0} e^{j\phi_{R_0}} H_{0,i} f_{T_i} e^{j\phi_{T_i}} S^C} \quad (21)$$

When $H_{i,0}$ and $H_{0,i}$ are eliminated from equation 21 based on equation 20, and when $r_{i,0}/r_{0,i}$ are replaced with $C_T^i$, equation 21 can be rewritten as:

$$C_T^i = \frac{f_{T_0}}{f_{R_0}} \frac{f_{R_i}}{f_{T_i}} e^{j(\phi_{T_0} - \phi_{R_0})} e^{-j(\phi_{T_i} - \phi_{R_i})} \quad (22)$$

The individual non-reciprocity compensation factor $C_T^i$ can be calculated using pilot symbols for each individual antenna of, for example, the base station 100B by following the above steps. For example, the individual component $C_T^i$ in equation (22) are ratios with the numerator being a pilot signal sent from an antenna "0" of the base station and received by antenna "i" of the base and a denominator being a signal sent from the antenna "i" and received by the antenna "0." The individual non-reciprocity compensation factors $C_T^i$ may be combined to the non-reciprocity compensation matrix $C_T$, and can be applied by a computing module to, for example, equation 10 to eliminate or at least minimize non-reciprocity of the TRX.

In some embodiments, the pilot symbols described with reference to FIGS. 2 and 3 may be transmitted periodically by, for example, interrupting the flow of the payload data in order to perform a periodic recalibration of the MIMO system 1000. With these embodiments, multiple symbols can be used to accelerate the calibration process while the payload data are not transmitted. In other embodiments, the pilot symbols may be transmitted and received in parallel with transmitting and receiving the payload data, therefore resulting in the calibration that does not interrupt the normal flow of the payload data. In some embodiments, the transmission of the payload data may be reduced, but not interrupted, to optimize the balance between the pilot (calibration) symbol and the payload data.

From the foregoing, it will be appreciated that specific embodiments of the invention have been described herein for purposes of illustration, but that various modifications may be made without deviating from the scope of the various embodiments of the invention. For example, one or more of the UE antennas can be brought in relatively close proximity to the base station antennas to transmit pilot symbols for the base station antennas. Furthermore, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

I claim:

1. A method for reciprocity calibration of a multiple-input multiple-output (MIMO) system, the method comprising:
   transmitting, by a base station, a pilot symbol by transmitters (TXes) of the base station, wherein the transmitted pilot symbol is received by a receiver (RX) of at least one reference antenna, as a first set of $r_{i0}$, pilot symbols;
   receiving, by the base station, a second set of pilot symbols by receivers (RXes) of the base station based on the first set of pilot symbols received and then transmitted from a transmitter (TX) of at least one reference antenna, wherein each of the second set of pilot symbols is received as an $r_{0,i}$ pilot symbol by an individual antenna of the base station, where index "i" denotes individual antenna "i" of the base station, and index "0" denotes the at least one reference antenna;
   calculating non-reciprocity compensation factors based on the first set of pilot symbols and the second set of pilot symbols, and
   applying the non-reciprocity compensation factors to payload data;
   wherein the non-reciprocity compensation factors are applied as $r_M = H_{DL} C_T WS$, wherein $r_M$ denotes received symbols by the antennas of the base station, $H_{DL}$ denotes an observed transfer function, $C_T$ denotes a matrix combination of the non-reciprocity compensation factors, and WS denotes a beamformed payload data.

2. The method of claim 1 wherein the at least one reference antenna is one of the antennas of the base station.

3. The method of claim 1 wherein the at least one reference antenna is an antenna at a user equipment (UE) side.

4. The method of claim 1 wherein the at least one reference antenna is a dedicated auxiliary (AUX) antenna.

5. The method of claim 1, wherein the non-reciprocity compensation factors are applied to payload data of the base station.

6. The method of claim 1 wherein the pilot symbol transmitted by the TX of the at least one reference antenna is outside of a frequency bandwidth of the payload data.

7. The method of claim 1 wherein the pilot symbol transmitted by the TX of the at least one reference antenna has a power spectral density that is generally comparable to that of symbols of the payload data.

8. The method of claim 1 wherein the pilot symbol transmitted by the TX of the at least one reference antenna is a first pilot symbol, the method further comprising transmitting a second pilot symbol by the TX of the at least one reference antenna.

9. The method of claim 1, further comprising transmitting the payload data from the TXes of the base station to RXes of a user equipment (UE) side, wherein the pilot symbol and the data payload are transmitted within same time domain and within different frequency bandwidths.

10. The method of claim 9 wherein the pilot symbol and the payload data are within same frequency bandwidth.

11. The method of claim 10 wherein transmitting the payload data pauses while transmitting the pilot symbol.

12. The method of claim 1, further comprising transmitting the payload data from the TXes of the base station to RXes of a user equipment (UE) side, wherein transmitting the payload data pauses when the pilot symbol is transmitted.

13. A multiple-input multiple-output (MIMO) system for wireless signals, comprising:
   a base station comprising a plurality of base station antennas, wherein the plurality of base stations antennas and antennas of a user equipment (UE) side are configured to exchange the wireless signals, and wherein transmitters (TXes) of the plurality of base station antennas are configured to transmit a symbol;
   a reference receiver (RX) and at least one reference antenna, the reference RX and the at least one reference antenna configured to receive a first set of pilot symbols based on to pilot symbol transmitted from the TXes of the base station, wherein each pilot symbol of the first set of pilot symbols is received as the $r_{0,i}$ pilot symbol of a transmitter (TX) of individual antenna "i" of the base station; and
   wherein receivers (RXes) of the plurality of the base station antennas are configured to receive a second set of pilot symbols from a transmitter (TX) of the at least one reference antenna, wherein the TX of the at least one reference antenna is configured to transmit the first set of pilot symbols that were received by the at least one reference antenna, wherein each pilot symbol of the second set of symbols is received as the $r_{i,0}$ pilot symbol of the RXes of the base station, wherein index "i" denotes individual antenna "i" of the base station, and index "0" denotes the at least one reference antenna;

wherein the (MIMO) system is configured to calculate non-reciprocity compensation factors based on the first set of pilot symbols and the second set of pilot symbols, and wherein the non-reciprocity compensation factors are applied to payload data;

wherein a computing module is further configured to apply the non-reciprocity compensation factors are as $r_M = H_{DL} C_T WS$, wherein $r_M$ denotes received symbols by the antennas of the base station, $H_{DL}$ denotes an observed transfer function, $C_T$ denotes a matrix combination of the non-reciprocity compensation factors, and WS denotes a beamformed payload data.

14. The system of claim 13 wherein the at least one reference antenna is one of the antennas of the base station.

15. The system of claim 13 wherein the at least one reference antenna is an antenna of the user equipment (UE) side.

16. The system of claim 13 wherein the at least one reference antenna is a dedicated auxiliary (AUX) antenna.

17. The system of claim 13 wherein the pilot symbol is one of a plurality of pilot symbols.

18. The system of claim 13 wherein the pilot symbol transmitted by the TX of the at least one reference antenna is outside of a frequency bandwidth of the payload data.

* * * * *